(12) United States Patent
Gourlay

(10) Patent No.: US 9,625,641 B2
(45) Date of Patent: Apr. 18, 2017

(54) LIGHT GUIDES

(75) Inventor: James Gourlay, Livingston (GB)

(73) Assignee: DESIGN LED PRODUCTS LIMITED, Edinburgh (GB)

( * ) Notice: Subject to any disclaimer, the term of this patent is extended or adjusted under 35 U.S.C. 154(b) by 0 days.

(21) Appl. No.: 13/254,990

(22) PCT Filed: Mar. 5, 2010

(86) PCT No.: PCT/GB2010/050388
§ 371 (c)(1),
(2), (4) Date: Sep. 6, 2011

(87) PCT Pub. No.: WO2010/100505
PCT Pub. Date: Sep. 10, 2010

(65) Prior Publication Data
US 2011/0317417 A1    Dec. 29, 2011

(30) Foreign Application Priority Data

| Mar. 5, 2009 | (GB) | ................................... | 0903862.1 |
| Mar. 24, 2009 | (GB) | ................................... | 0905070.9 |
| Nov. 20, 2009 | (GB) | ................................... | 0920333.2 |
| Nov. 30, 2009 | (GB) | ................................... | 0920922.2 |

(51) Int. Cl.
*F21V 8/00* (2006.01)

(52) U.S. Cl.
CPC .......... *G02B 6/0068* (2013.01); *G02B 6/0043* (2013.01); *G02B 6/0073* (2013.01); *G02B 6/0085* (2013.01); *Y10T 29/49826* (2015.01)

(58) Field of Classification Search
CPC .. G02B 6/0011; G02B 6/0018; G02B 6/0033; G02B 6/004; G02B 6/0076; G02B 6/0091

USPC ...... 362/631, 606, 612, 613, 615, 97.2, 97.1
See application file for complete search history.

(56) References Cited

U.S. PATENT DOCUMENTS

| 4,877,451 | A | 10/1989 | Winnik et al. .................. 106/23 |
| 5,408,387 | A | 4/1995 | Murase et al. .................. 362/31 |
| 5,836,096 | A * | 11/1998 | Brauer ............................ 40/361 |
| 5,971,559 | A * | 10/1999 | Ishikawa et al. ............. 362/625 |
| 6,030,108 | A | 2/2000 | Ishiharada .................... 362/562 |
| 6,337,946 | B1 | 1/2002 | McGaffigan .................. 385/901 |
| 6,356,389 | B1 | 3/2002 | Nilsen et al. ................. 359/625 |
| 6,443,579 | B1 * | 9/2002 | Myers ........................... 359/613 |
| 6,561,663 | B2 | 5/2003 | Adachi et al. .................. 362/31 |
| 6,609,799 | B1 * | 8/2003 | Myers ........................... 359/613 |

(Continued)

FOREIGN PATENT DOCUMENTS

| CN | 101196573 | 6/2008 |
| DE | 20 2007 017 224 | 4/2008 |

(Continued)

OTHER PUBLICATIONS

International Search Report (ISR) and Written Opinion (WO) in PCT/GB2010/050388 dated Jan. 7, 2010.

(Continued)

*Primary Examiner* — Laura Tso
(74) *Attorney, Agent, or Firm* — Harness, Dickey & Pierce, P.L.C.

(57) ABSTRACT

This invention relates to light guide devices and methods of manufacture. The light guide device is suitable for use in a range of applications, particularly in connection with the backlighting of displays, for example, liquid crystal displays.

27 Claims, 8 Drawing Sheets

(56) References Cited

U.S. PATENT DOCUMENTS

| | | | |
|---|---|---|---|
| 6,947,110 B2* | 9/2005 | Morimoto et al. | 349/114 |
| 6,969,189 B2* | 11/2005 | Lee et al. | 362/631 |
| 7,287,891 B1 | 10/2007 | Park et al. | 362/555 |
| 7,288,320 B2 | 10/2007 | Steenblik et al. | 428/403 |
| 7,334,933 B1 | 2/2008 | Simon | 362/615 |
| 7,663,804 B2 | 2/2010 | Chang | 359/599 |
| 7,719,016 B2 | 5/2010 | Nada et al. | 257/95 |
| 7,780,306 B2* | 8/2010 | Hoshi | 362/97.1 |
| 7,791,683 B2 | 9/2010 | Larson et al. | 349/62 |
| 7,929,816 B2 | 4/2011 | Meir et al. | 385/39 |
| 7,954,990 B2* | 6/2011 | Gourlay | 362/616 |
| 7,959,343 B2 | 6/2011 | Ijzerman et al. | 362/625 |
| 7,980,747 B2 | 7/2011 | Vissenberg et al. | 362/612 |
| 8,011,818 B2 | 9/2011 | Negley | 362/613 |
| 8,092,064 B2 | 1/2012 | Erchak et al. | 362/613 |
| 8,128,272 B2 | 3/2012 | Fine et al. | 362/606 |
| 8,129,731 B2* | 3/2012 | Vissenberg et al. | 257/88 |
| 8,182,128 B2 | 5/2012 | Meir et al. | 362/612 |
| 8,215,815 B2* | 7/2012 | Meir et al. | 362/606 |
| 8,238,703 B2 | 8/2012 | Meir et al. | 385/39 |
| 8,264,622 B2 | 9/2012 | Gourlay | 349/3 |
| 8,393,748 B2 | 3/2013 | Herrmann et al. | 362/97.3 |
| 8,393,775 B2 | 3/2013 | Kim et al. | 362/613 |
| 8,432,527 B2 | 4/2013 | Tomlinson | 349/166 |
| 8,467,013 B2 | 6/2013 | Gourlay | 349/64 |
| 2002/0008807 A1 | 1/2002 | Miyatake et al. | 349/65 |
| 2003/0016314 A1 | 1/2003 | Dong et al. | 349/65 |
| 2003/0039113 A1 | 2/2003 | Murr et al. | 362/31 |
| 2003/0210222 A1 | 11/2003 | Ogiwara et al. | 345/103 |
| 2003/0232179 A1 | 12/2003 | Steenblik et al. | 428/195.1 |
| 2004/0028875 A1 | 2/2004 | Van Rijn et al. | 428/98 |
| 2004/0067360 A1 | 4/2004 | Steenblik et al. | 428/402 |
| 2004/0085749 A1 | 5/2004 | Parker et al. | 362/31 |
| 2004/0130515 A1 | 7/2004 | Chuang et al. | 345/82 |
| 2004/0136667 A1 | 7/2004 | Leu et al. | 385/120 |
| 2005/0265029 A1 | 12/2005 | Epstein et al. | 362/339 |
| 2006/0002146 A1 | 1/2006 | Baba | 362/613 |
| 2006/0046159 A1 | 3/2006 | Emslander et al. | 430/5 |
| 2006/0056166 A1 | 3/2006 | Yeo | 362/19 |
| 2006/0083019 A1 | 4/2006 | Hahm et al. | 362/555 |
| 2006/0087827 A1 | 4/2006 | Jung et al. | 362/29 |
| 2006/0092663 A1 | 5/2006 | Noh et al. | 362/608 |
| 2006/0187552 A1 | 8/2006 | Huang et al. | 359/619 |
| 2006/0227323 A1 | 10/2006 | Goto | 356/336 |
| 2006/0256255 A1 | 11/2006 | Minami | 349/65 |
| 2007/0081339 A1 | 4/2007 | Chung et al. | 362/294 |
| 2007/0086179 A1 | 4/2007 | Chen et al. | 362/27 |
| 2007/0121340 A1 | 5/2007 | Hoshi | 362/600 |
| 2007/0133229 A1 | 6/2007 | Tsai | 362/633 |
| 2007/0147073 A1 | 6/2007 | Sakai et al. | 362/607 |
| 2007/0159699 A1 | 7/2007 | Wang et al. | 359/599 |
| 2007/0172171 A1 | 7/2007 | Van Ostrand et al. | 385/31 |
| 2007/0212533 A1 | 9/2007 | Jones et al. | 428/331 |
| 2007/0279773 A1 | 12/2007 | Johnson et al. | 359/831 |
| 2008/0007541 A1* | 1/2008 | Eliasson et al. | 345/176 |
| 2008/0013323 A1 | 1/2008 | Katsumoto et al. | 362/311 |
| 2008/0043173 A1 | 2/2008 | Lin et al. | 349/65 |
| 2008/0055931 A1 | 3/2008 | Verstraete et al. | 362/612 |
| 2008/0080167 A1* | 4/2008 | Chang | 362/97 |
| 2008/0117620 A1 | 5/2008 | Hama et al. | 362/84 |
| 2008/0129927 A1* | 6/2008 | Hamada et al. | 349/65 |
| 2008/0130018 A1 | 6/2008 | Steenblik et al. | 356/625 |
| 2008/0137197 A1 | 6/2008 | Hsu et al. | 359/599 |
| 2008/0152933 A1 | 6/2008 | Mizuno et al. | 428/480 |
| 2008/0266863 A1 | 10/2008 | Rinko | 362/278 |
| 2008/0285305 A1* | 11/2008 | Fujino et al. | 362/612 |
| 2008/0296792 A1 | 12/2008 | Gourlay | 264/1.24 |
| 2009/0086508 A1* | 4/2009 | Bierhuizen | 362/617 |
| 2009/0121988 A1 | 5/2009 | Amo et al. | 345/82 |
| 2009/0161341 A1 | 6/2009 | Meir et al. | 362/84 |
| 2010/0142222 A1* | 6/2010 | Vahabzadeh | 362/615 |
| 2010/0164079 A1* | 7/2010 | Dekker et al. | 257/676 |
| 2011/0050735 A1* | 3/2011 | Bae et al. | 345/690 |
| 2011/0051037 A1 | 3/2011 | Kim et al. | 349/62 |
| 2011/0182084 A1 | 7/2011 | Tomlinson | 362/608 |
| 2011/0234941 A1 | 9/2011 | Gourlay | 349/64 |
| 2011/0317417 A1 | 12/2011 | Gourlay | 362/235 |
| 2012/0002438 A1 | 1/2012 | Gourlay | 362/606 |

FOREIGN PATENT DOCUMENTS

| | | | |
|---|---|---|---|
| EP | 0 797 045 | 9/1997 | |
| EP | 1 640 756 | 3/2006 | |
| EP | 1 860 919 | 11/2007 | |
| EP | 1 890 186 | 2/2008 | |
| GB | 2 425 392 | 10/2006 | |
| GB | 2 431 730 | 5/2007 | |
| GB | 2 438 440 | 11/2007 | |
| GB | 2 448 564 | 10/2008 | |
| GB | 2448564 A * | 10/2008 | G02B 6/00 |
| GB | 2 454 928 | 5/2009 | |
| GB | 2 459 888 | 11/2009 | |
| GB | 2 463 913 | 3/2010 | |
| GB | 2 464 916 | 5/2010 | |
| GB | 2 468 353 | 9/2010 | |
| GB | 2 468 410 | 9/2010 | |
| GB | 2 468 411 | 9/2010 | |
| GB | 2 468 875 | 9/2010 | |
| GB | 2 475 510 | 5/2011 | |
| JP | 3019466 | 10/1995 | G02B 6/00 |
| JP | 2002-287143 | 10/2002 | G02F 1/13357 |
| JP | 2004-241282 | 8/2004 | |
| JP | 2004-296300 | 10/2004 | F21V 8/00 |
| JP | 2006-351375 | 12/2006 | F21V 8/00 |
| JP | 2007-012856 | 1/2007 | H01L 33/00 |
| JP | 2007-041622 | 2/2007 | G09F 13/18 |
| JP | 2007-535790 | 12/2007 | F21V 8/00 |
| JP | 2008-096889 | 4/2008 | |
| JP | 2008-305642 | 12/2008 | F21V 8/00 |
| WO | WO 96/21122 | 7/1996 | |
| WO | WO 01/51848 | 7/2001 | |
| WO | WO 2005/101070 | 10/2005 | |
| WO | WO 2005/107363 | 11/2005 | |
| WO | WO 2006/014822 | 2/2006 | |
| WO | WO 2006/126155 | 11/2006 | |
| WO | WO 2007/000695 | 1/2007 | |
| WO | WO 2007/034398 | 3/2007 | |
| WO | WO 2007/138294 | 12/2007 | G02B 6/00 |
| WO | WO 2007/143341 | 12/2007 | |
| WO | WO 2008/038728 | 4/2008 | |
| WO | WO 2008/047286 | 4/2008 | F21V 8/00 |
| WO | WO 2008/061059 | 5/2008 | |
| WO | WO 2008/087572 | 7/2008 | |
| WO | WO 2008/122909 | 10/2008 | |
| WO | WO 2009/066056 | 5/2009 | |
| WO | WO 2009/068860 | 6/2009 | |
| WO | WO 2010/035050 | 4/2010 | |
| WO | WO 2010/046694 | 4/2010 | |
| WO | WO 2010/100504 | 9/2010 | |

OTHER PUBLICATIONS

Search Report under Section 17 in GB0905070.9 dated Jun. 9, 2009.
Search Report under Section 17 in GB0903862.1 dated Jun. 30, 2009.
Search Report under Section 17 in GB0920333.2 dated Feb. 11, 2011.
Search Report under Section 17 in GB0920922.2 dated Mar. 1, 2011.
Office Action, dated Sep. 13, 2013 issued in Japanese Patent Application No. JP 2011-532720.
Office Action, dated Oct. 22, 2013 issued in Japanese Patent Application No. JP 2011-552528.
International Search Report (ISR) and Written Opinion (WO), dated Feb. 25, 2009 from PCT Application PCT/GB2008/003862.
International Search Report (ISR) and Written Opinion (WO), dated Mar. 12, 2009 from PCT Application PCT/GB2008/003928.
International Search Report (ISR) and Written Opinion (WO), dated Feb. 23, 2010 from PCT Application PCT/GB2009/051270.
International Search Report (ISR) and Written Opinion (WO), dated Apr. 13, 2010 from PCT Application PCT/GB2009/051409.

(56) References Cited

OTHER PUBLICATIONS

International Search Report (ISR) and Written Opinion (WO), dated May 7, 2010 from PCT Application PCT/GB2010/050387.
International Preliminary Report on Patentability (IPRP), dated Nov. 2, 2009 from PCT Application PCT/GB2008/003862.
International Preliminary Report on Patentability (IPRP), dated Nov. 2, 2009 from PCT Application PCT/GB2008/003928.
International Preliminary Report on Patentability (IPRP), dated Sep. 6, 2010 from PCT Application PCT/GB2009/051270.
International Preliminary Report on Patentability (IPRP), dated Apr. 26, 2011 from PCT Application PCT/GB2009/051409.
UK Search Report, dated Mar. 10, 2008 in GB Application No. GB0723057.6.
UK Search Report, dated Mar. 20, 2008 in GB Application No. GB0723166.5.
UK Search Report, dated Feb. 13, 2009 in GB Application No. GB0817829.5.
UK Search Report, dated Jan. 8, 2009 in GB Application No. GB0819308.8.
UK Search Report, dated Jun. 9, 2009 in GB Application No. GB0905070.9.
UK Search Report, dated Jun. 30, 2009 in GB Application No. GB0903862.1.
UK Search Report, dated Feb. 15, 2011 in GB Application No. GB0920328.2.
UK Examination Report, dated Oct. 27, 2008 in GB Application No. GB0723166.5.
UK Examination Report, dated Jun. 28, 2011 in GB Application No. GB0817829.5.
UK Examination Report, dated Oct. 23, 2012 in GB Application No. GB0819308.8.
Office Action, dated Aug. 27, 2012, issued in Chinese Patent Application No. 200980141892.4 with English Translation.
Office Action, dated Nov. 16, 2011 issued in U.S. Appl. No. 12/744,149.
Office Action, dated Sep. 12, 2012 issued in U.S. Appl. No. 12/744,644.
Office Action, dated Jan. 2, 2013, issued in U.S. Appl. No. 13/125,134.
Office Action, dated Sep. 4, 2013, issued in U.S. Appl. No. 13/125,134.
Office Action, dated Jan. 15, 2013, issued in U.S. Appl. No. 13/254,985.
Office Action, dated Sep. 5, 2013, issued U.S. Appl. No. 13/254,985.
Office Action, dated Jul. 29, 2014, issued in Taiwan Patent Application No. 099106479, for which no English translation is available.
Chinese Office Action, dated Jul. 14, 2014, issued in Chinese Patent Application No. 201080010523.4, with English translation.
European Office Action (Communication pursuant to Article 94(3) EPC), dated Dec. 11, 2014, issued in European Patent Application No. 10 707 118.5-1562.
European Office Action (Communication pursuant to Article 94(3) EPC), dated Dec. 10, 2014, issued in European Patent Application No. 10 707 119.3-1562.
Japanese Office Action, dated Sep. 16, 2014, issued in Japanese Patent Application No. 2011-552528, with English Translation.

\* cited by examiner

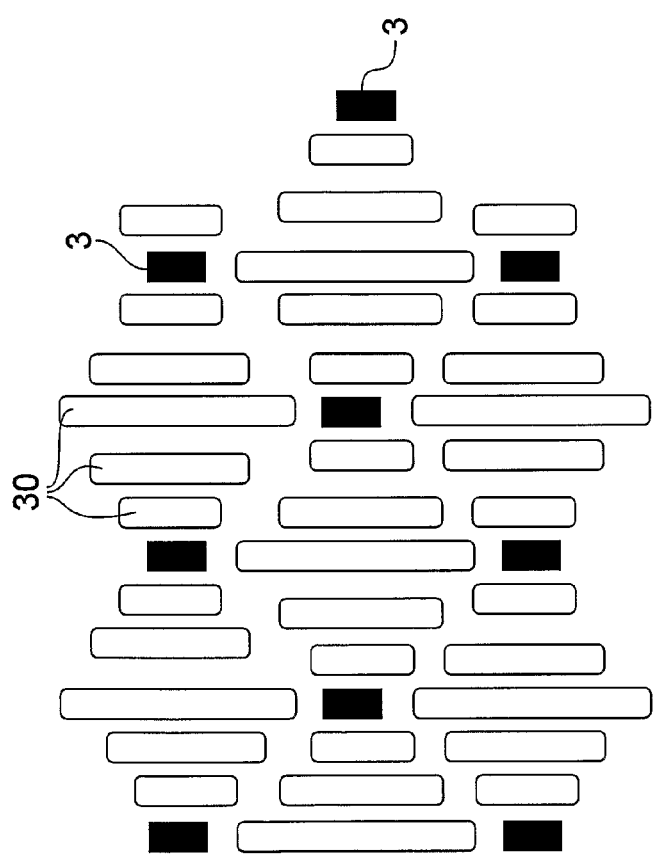
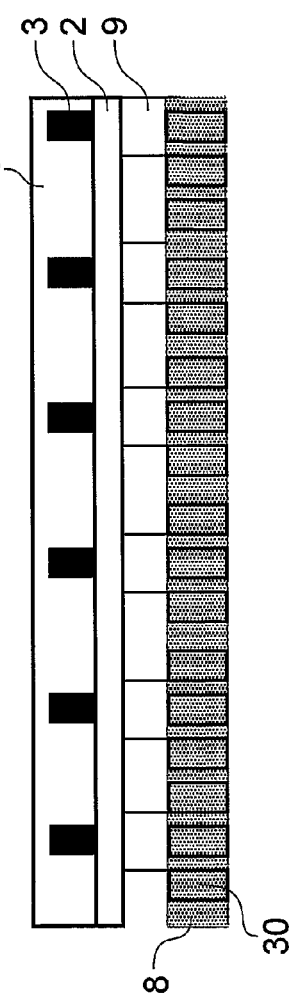
FIG. 3a
FIG. 3b

LIGHT GUIDES

CROSS REFERENCE TO RELATED APPLICATION

This application is a 371 of PCT International Application No. PCT/GB2010/050388 filed Mar. 5, 2010 (Publication No. WO 2010/100505), which claims priority to GB Patent Application No. 0903862.1, filed Mar. 5, 2009, GB Patent Application No. 0905070.9, filed Mar. 24, 2009, GB Application No. 0920333.2, filed Nov. 20, 2009 and GB Application No. 0920922.2, filed Nov. 30, 2009. The disclosures of the above applications are incorporated herein by reference in their entirety.

FIELD OF THE INVENTION

This invention relates to light guide devices and methods of manufacture. The light guide devices are suitable for use in a range of applications, particularly in connection with the backlighting of displays, for example, liquid crystal displays.

BACKGROUND OF THE INVENTION

A number of light guiding devices are known. These devices are employed for a range of functions including illumination, backlighting, signage and display purposes. Typically, the devices are constructed from an injection moulded or machined transparent plastic component, where a light source, such as a fluorescent lamp or a plurality of light emitting diodes (LEDs), is integrated by means of mechanical attachment at the edge of the transparent plastic component.

Common to all of these devices is the fact that light from the light source is guided through a transparent guide, typically made of plastic, by total internal reflection. For backlighting applications, light is emitted in a substantially perpendicular direction to that of the direction of propagation of the light within the transparent guide. This is achieved through the light being directed so as to interact with scattering structures or films located within, or on the surface of, the transparent guide.

The integration of fluorescent lamps or LEDs to the edge of the transparent light guide is not a straightforward process and thus significantly increases the complexity of the production process for these devices. Achieving a good coupling of the light source and the light guide is essential to the optical performance of the device. In addition, edge coupling of the light sources renders these components susceptible to mechanical damage during both the production process and the normal use of the device.

In seeking to provide thin direct lit backlights, it is preferable to have light emitted into the plane of the light guide. Further benefit may be obtained if the light sources are distributed across the panel, so minimising the length of guiding in the light guide. This has the benefit of creating a thin and efficient backlight but has the disadvantage of compromising the light uniformity. For example, this may be through the creation of dark spots and/or more intense areas of light above or in the vicinity of the light source. Preferably, these dark spots and/or more intense areas of light should not be visible or, at least, reduced in appearance in order to provide at least acceptable, and more preferably, improved light uniformity. Existing solutions to this problem tend to add considerable thickness to the backlight.

Many backlights fall into the categories of "edge-lit" or "direct-lit". These categories differ in the placement of the light sources relative to the output of the backlight, where the output area defines the viewable area of the display device. In edge-lit backlights, one or more light sources are disposed along an outer border or edge of the backlight construction outside the zone corresponding to the output area. The light sources typically emit light into a light guide, which has length and width dimensions of the order of the output area and from which light is extracted to illuminate the output area. In direct-lit backlights, an array of light sources is disposed directly behind the output area, and a diffuser is placed in front of the light sources to provide a more uniform light output. Some direct-lit backlights also incorporate an edge-mounted light, and are thus illuminated with a combination of direct-lit and edge-lit illumination.

Apart from producing light, the light sources also produce heat. If the heat dissipates into a liquid crystal panel for example, the display quality may be adversely affected. Because the transfer of heat to the liquid crystal panel is unlikely to be uniform, the liquid crystal layer within the liquid crystal panel may be subjected to different degrees of heating. This non-uniform distribution of heat may also affect the switching of thin film transistors inside the liquid crystal display and the overall display quality of the liquid crystal panel may deteriorate. There are numerous challenges to overcome in thermally managing a backlight unit for use in combination with displays. Addressing issues surrounding thermal management should not result in an unacceptable increase in weight or thickness or compromise the mechanical integrity of the backlight unit. In addition, the optical performance of the backlight unit should not be significantly compromised.

Other challenges facing display manufacturers, such as those incorporating large area LED Back Light Units (BLUs) include producing a thin and efficient device which enables 2-d or 3-d spatial dimming to support high display performance and reduced power consumption. This has proved problematic for both edge-lit and direct lit devices and has typically resulted in thicker backlight devices. 2-d dimming relates to when the image content of the display is achieved by only switching on selected areas of the backlight which match or correspond to the desired image thus resulting in significant power reduction. 3-d dimming further incorporates the use of colour.

The beam angle of light emerging from a backlight and the uniformity of said beam angle are important in determining the efficiency and the viewing angle of the display that is being illuminated. Some degree of control over the range of light output angles provided by the backlight is desirable.

It is an object of the present invention to provide a light guiding device that addresses one or more of the aforesaid issues. In particular, it is an object of the present invention to provide a light guiding device that addresses the problems associated with thermal management.

SUMMARY OF THE INVENTION

In a first aspect of the present invention, there is provided a light guide device comprising a base substrate having a first refractive index, upon a first surface of which are mounted one or more light sources and a first guide layer having a second refractive index that is optionally less than or equal to the first refractive index and which comprises a light output surface, the first guide layer being arranged so as to encapsulate the one or more light sources upon the first surface, wherein the base substrate and the guide layer form a composite structure for guiding light produced by the one or more light sources over the first surface, further comprising thermal bonding material in contact with the lower surface of the base substrate wherein the lower surface is opposite and parallel or substantially parallel to the first surface, and wherein said thermal bonding material contacts a heat sink plate and forms an air gap between the lower surface of the base substrate and the heat sink plate.

Advantageously, said one or more light sources are positioned directly behind the light output surface and direct light parallel to the plane of the base substrate.

The lower surface of the base substrate may be referred to herein as a second surface of the base substrate. As such, the second (or lower) surface is opposite the first surface of the base substrate.

The light guide device may further comprise one or more features or structures that break or disrupt the total internal reflection of guided light. For example, the light guide device may comprise one or more scattering and/or reflective and/or refractive structures arranged so as to direct light away from the first surface and in the direction of the light output surface. For example, the one or more scattering and/or reflective and/or refractive structures may be located at the interface between the base substrate and the first guide layer and/or on the lower surface of the substrate which is opposite the first surface.

The light guide device may comprise a diffuser located above the light output surface.

Upon the first guide layer there may be mounted a second guide layer having a third refractive index that is equal to or greater than the refractive index of the first guide layer and at the interface between the first and second guide layer and above the one or more sources of light may be located one or more light scattering and/or reflective and/or refractive structures. The concealment of the one or more light sources may be provided by only, or substantially only, light directed normal, or substantially normal, to the plane of the substrate in combination with the diffuser and optionally in combination with a single light guide layer.

The thermal bonding material may be present in discrete portions and may be positioned in line or substantially in line with the one or more sources of light. The non-continuous nature of the thermal bonding material means that an air gap or gaps are formed between the substrate and the heat sink plate thus facilitating efficient heat dissipation. Advantageously, the heat sink plate and the base substrate are not optically coupled.

The one or more light sources may direct at least some light parallel to the plane of the base substrate. Advantageously, the one or more light sources comprise, or consist of, or consist essentially of side emitting LEDs. Preferably, the one or more light sources form an array of side-emitting LEDs across the base substrate in a direct-lit arrangement. Preferably, a portion of the light emitted by the one or more light sources is not coupled into the light guide but is directed normal or substantially normal to the base substrate and in the direction of the light output surface. Typically, this is less than about 20% of the light emitted from the one or more light sources, for example less than about 10% of the light emitted from the one or more light sources, for example about 2% or less of the light emitted from the one or more light sources. The one or more light sources may also include a number of top emitting LEDs. The top emitting LEDs emit light substantially perpendicularly to the main light output of the side emitting LEDs and in the direction of the light output surface. The array of side emitting LEDs may form a two dimensional array of side emitting LEDs in a direct-lit arrangement. The array may comprise, consist of, or consist essentially of a number of rows and/or columns of LEDs which may vary in which direction they direct at least some light parallel to the plane of the base substrate. For example, the LEDs may be arranged so that for an LED in a particular column or row the LED may direct light in substantially the opposite direction when compared with either of the two LEDs to which it is immediately adjacent in said column or row. For example, for two adjacent LEDs, the angle between the direction of light generated by the first LED in a first direction which is substantially parallel to the plane of the base substrate and the direction of light generated by the second LED in a second direction which is also substantially parallel to the plane of the base substrate may be about 180°. In a given row or column, the LEDs may be positioned so that they are substantially in a straight line. The LEDs may be positioned so that alternate LEDs are in a straight line thus forming two substantially parallel lines of LEDs in a given row or column. In an alternative arrangement, the LEDs may be positioned forming a repeating diamond like arrangement or array of LEDs across the substrate. The LEDs may be arranged such that the light is emitted in the same or substantially the same direction for all or substantially all of the LEDs.

According to a second aspect of the present invention, there is provided a method of producing a light guide device, the method comprising:

i. mounting one or more light sources onto a first surface of a base substrate having a first refractive index; and ii. adding a first guide layer, having a second refractive index that may be less than or equal to the first refractive index, to the first surface so as to encapsulate the one or more light sources upon the first surface;

iii. applying one or more scattering and/or reflective and/or refractive structures on the first guide layer and/or the substrate before the substrate and the first guide layer are combined, such that said one or more scattering and/or reflective and/or refractive structures are located at the interface between the substrate and the first guide layer; or applying one or more scattering and/or reflective and/or refractive structures on the lower surface of the base substrate;

iv. adding a heat sink plate to the lower surface of the base substrate which is opposite the first surface of the base substrate, wherein the heat sink plate is in contact with said base substrate via discrete portions of thermal bonding material.

In the method according to the second aspect of the invention, further steps may be incorporated in order to mount a second guide layer having a third refractive index that is equal to or greater than the refractive index of the first guide layer and at the interface between the first and second guide layer and above the one or more sources of light may be located one or more light scattering and/or reflective and/or refractive structures.

The method according to the second aspect of the invention provides a means for guiding light produced by the one or more light sources over the first surface of the base substrate. The light may be guided within the composite structure by total internal reflection.

Preferably, the method of adding the first guide layer to the first surface of the base substrate and/or mounting the second guide layer onto the first guide layer comprises:

i. applying a liquid polymer on the first surface of the base substrate and/or first guide layer; and ii. curing the liquid polymer on the first surface of the base substrate and/or first guide layer.

The method of applying the liquid polymer on the first surface of the base substrate and/or the first guide layer may comprise printing, stencilling or dispensing the liquid polymer.

The step of applying one or more scattering and/or reflecting and/or refracting structures so as to redirect light away from the first surface of the base substrate or the first guide layer may comprise printing a patterned, reflecting ink layer.

The arrangement of the guide layer or layers in relation to the light sources provides a light guiding device that exhibits enhanced mechanical protection for the light sources. Furthermore, a device is provided that is simple to produce and which exhibits enhanced optical coupling of the light within the device. For those embodiments where the refractive index of the base substrate and the optional second guide layer are selected to be equal to or higher than that of the first guide layer, the generated light is guided within both the light transmissive or transparent base substrate and the guide layer or layers due to the effects of total internal reflection.

The base substrate and the first and second guide layers may be light transmissive and preferably transparent to the light generated by the one or more light sources. The terms "transparent" and "transmissive" relate to the optical properties of particular components of the device relative to the wavelength of the light generated by the incorporated light sources.

According to a third aspect of the present invention, there is provided a display device comprising a light guiding device according to the various aspects including the first aspect of the invention. The display device may be a liquid crystal display device and may therefore comprise a liquid crystal cell which may also be referred to as a liquid crystal panel.

The present invention seeks to provide one or more of the following advantages: a more uniform light guide device (including uniform or substantially uniform luminance) with reduced/no dark spots when viewed in use; efficient light distribution resulting in lower power requirements; a thinner, lighter structure; a device comprising a reduced number of system components. The devices according to the present invention may advantageously be used for 2-d and 3-d dimming. In particular, the present invention seeks to provide effective thermal management of backlight devices without adversely affecting the optical performance.

The present invention also provides improved optical coupling from the light sources to the light guide, short average optical path lengths resulting in minimal optical loss in the light guide, minimal surface scattering and beneficial extracted light beam profiles. For example the present invention can provide good uniformity of extracted light possessing desirable angles of distribution, e.g. about +/−30° from the normal at full width half maximum. In addition, these features serve to provide a highly optically efficient (for example equal to or greater than about 90%) backlight which is scalable up to >80 inches (diagonal).

DETAILED DESCRIPTION OF THE INVENTION

Base Substrate

The base substrate may be light transmissive and may be transparent. The base substrate may be formed from a transparent polymer sheet such as polyester or polycarbonate. The thickness of the transparent base substrate is typically of the order of about 0.1 mm, for example in the range of about 0.1 mm to about 0.2 mm. The refractive index of the base substrate is typically equal to or greater than 1.5. For example, the refractive index of the base substrate may be 1.50 to 1.58.

The base substrate may be a microstructured film which has an ink in contact with one or more of said microstructures, wherein said ink reduces the amount of light escaping from said microstructure. Alternatively, a microstructured film may be applied to the base substrate. Brightness Enhancement Films (BEFs) are suitable microstructured films for use in the present invention. A suitable example of a microstructured film is BEF III Brightness Enhancement Film, which is commercially available from 3M. A particular film from this range is made from polyester substrate of thickness 127 microns and possesses a prism structure, varying in one direction, in acrylic polymer. The prism structure is 28 microns high, has a pitch of 50 microns and the prism angle is 90°. Such a film, suitably modified with ink, may be used in the present invention to produce a backlight with a non-symmetrical beam angle of the scattered light, provided that light is input from one of the edges parallel to the prism direction. The ink which may be applied to the microstructures may be light transmissive. Light transmissive ink has the effect of planarising or flattening the microstructures and facilitates light guiding by total internal reflection over the film layer. Light transmissive or transparent ink reduces the amount of light escaping from the film at the microstructure on which it is deposited. Without wishing to be bound by theory, it is believed that light which is being guided by total internal reflection through the light guide plate, encounters a substantially flat surface at the interface between the planarised film layer and air. The substantially flat, planarised surface will retain the total internal reflection and the light will continue to be guided within the light guide device. The structured surface which is not modified with an ink scatters light out from the light guide device by breaking the total internal reflection. Reflective ink may also be used on the microstructures as an alternative means for facilitating extraction of light out from the light guide device and controlling the direction in which the light is extracted. Suitable reflective inks for use in the present invention may comprise metal loaded polymers. Preferably, the refractive indices of the ink and the microstructure should match as closely as possible. For example, the difference in refractive indices should be about 2% or less, more preferably about 1% or less.

The ink, which is typically a polymeric material, may be applied to the microstructured surface of the film to form a thin pattern of features according to any of a number of methods and may be referred to in general terms as an additive printing process. For example, conventional screen printing, incorporates the use of a mesh screen with openings corresponding to the pattern required to be printed. This pattern facilitates the accurate delivery of a volume of ink to the required areas of the microstructures to be planarised. A suitable UV curing ink is Windowtex Gloss which is an acrylic based, transparent UV curing polymer screen printable ink and is commercially available from MacDermid Autotype. Suitable inks for use in the present invention include those which may be UV or solvent cured. Other suitable examples of additive printing methods include stencil printing, ink jet printing, flexographic printing and other known lithographic techniques.

The ink may be applied in varying amounts and shapes. This may depend on how close to the light source the ink is being deposited. The intensity of the light becomes less as the distance from the light source increases. To take account of this, larger sized light transmissive ink dots which are more closely spaced may be deposited closer to the position of the light source resulting in small areas of unplanarised microstructure, whereas smaller sized light transmissive ink dots which are more widely spaced may be deposited as the distance from the light source increases, resulting in larger areas of unplanarised microstructure.

Light Sources

The light source can be any of those known to those skilled in the art, including those which are suitable for use in backlighting. Such light sources include one or more LEDs. The light may be non-directional. The LEDs can be any of the designs known to those skilled in the art, including edge-emitting, side emitting, top emitting or bare die LEDs. The LEDs may be selected from one or more of a range of colours. For example, the LEDs may be white. White light may also be generated by combining red, green and blue LEDs. Typically, an LED suitable for use in the present invention is of the order of about 1 mm in each dimension.

The light sources may be arranged to direct substantially all of the light into the light guide. Advantageously, they are selected from side-emitting LEDs wherein the light is directed parallel, or substantially parallel to the plane of the substrate. Even more advantageously a proportion of the light is not coupled into the light guide but is allowed to propagate in the direction of the output surface. For example, less than about 20% of the light emitted from the one or more light sources, for example less than about 10% of the light emitted from the one or more light sources, for example about 2% or less of the light is allowed to propagate in such a manner. The effect of allowing this light to propagate towards the output surface is that the appearance of the light sources is concealed when viewed in normal use and the light is distributed more uniformly. In particular, this light allows a diffuser to be positioned more closely to the light guide layer than in other conventional backlights.

Advantageously, the one or more lights sources are arranged to provide direct-lit light guide devices, including direct-lit backlight units. The one or more light sources may form an array of light sources across the base substrate in a direct-lit arrangement. This arrangement serves to provide a good thermal solution compared to more conventional arrangements. This direct-lit arrangement may consist of an array of light sources forming a series of rows and columns across the whole of, or substantially the whole of, the base substrate. The array may comprise, consist of or consist essentially of an array of side-emitting LEDs in a direct-lit arrangement. Such an array may also include a number of top emitting LEDs. The one or more light sources may be arranged in a regular repeating pattern across the base substrate.

Electrical tracks may be patterned onto the base substrate which may be transparent, so forming electrical bonding pads for the one or more light sources and electrical connections for external electrical driving equipment. The electrical tracks may be patterned by etching methods, for example, using copper or gold, or by additive screen printing methods, for example, using silver loaded adhesive.

The LED light sources may be electrically and mechanically attached to the electrical bonding pads by soldering or conducting adhesive methods.

Guide Layers

The guide layer or layers (which may also be referred to as light guide layers) which are typically suitable for use in a backlight unit may be transparent. The guide layer or layers may comprise a transparent flexible plastic polymer layer, typically of about 1 mm in thickness. The refractive index of the guide layer may have a refractive index of about 1.46 to 1.56.

The refractive indices of the first and second guide layers may be substantially the same or the refractive index of the second guide layer may be higher than the first guide layer. For the situation where the second light guide layer has a higher refractive index, the difference in refractive indices may be as high as about 10%.

The guide layers may be made from a range of available polymers, including acrylics, urethanes or polycarbonates.

The guide layers may be combined using a standard lamination technique. Such a technique may require the use of a transparent adhesive which has a refractive index which is higher than both the first and second guide layers. The guide layers may be optically joined during manufacture. The method of combining the layers may comprise applying and curing a liquid polymer layer. Methods of curing may make use of one or more techniques including UV, thermal or two-part curing. The method may comprise printing, stencilling or dispensing the liquid polymer. Optically joined indicates the layers are combined in such a way that, optically, these layers are effectively indistinguishable. This technique may also be used for combining the first guide layer and the base substrate.

Upon the first guide layer, which may be transparent, there may be mounted a second guide layer having a third refractive index that is equal to or greater than the refractive index of the first guide layer and at the interface between the first and second guide layer and above the one or more sources of light may be located one or more light scattering and/or reflective structures. The first and second light guide layers may be laminated together. Lamination may be achieved using a uv curable clear polymer adhesive such as Dymax.

Light Scattering and/or Reflective and/or Refractive Structures

The light guide device may further comprise one or more features that break the total internal reflection of the guided light. For example, the light guide device may further comprise the light scattering and/or reflective and/or refractive structures which disturb the total internal reflection of the guided light. The application of the structures may be accomplished using standard printing, micromoulding, microstamping and microembossing techniques. Suitable scattering structures may be in the form of a patterned reflecting ink layer. Suitable scattering features include highly reflective white printed ink dots. In such an arrangement, each dot disturbs the total internal reflection of the guided light and causes the light to be scattered randomly and to escape from the light guide. The size and/or pitch of the dots may be varied to ensure uniform light scatter.

The ink, which may be a polymeric material, may be applied to the base substrate or a guide layer to form a thin pattern of features, according to any of a number of methods and may be referred to in general terms as an additive printing process. For example, conventional screen printing incorporates the use of a mesh screen with openings corresponding to the pattern required to be printed. This pattern facilitates the accurate delivery of a volume of ink to the required areas of the guide layer or base substrate. Suitable inks for use in the present invention include those which may be UV or solvent cured. Other suitable examples of additive printing methods include stencil printing, ink jet printing, flexographic printing and other known lithographic techniques. The ink may be applied in varying amounts and shapes.

Other suitable structures include microstructured surfaces which comprise a plurality of three dimensional features, or irregularities, which are proud of the surface and arranged on a scale of about 1 to about 1000 microns, independently, in width, depth and pitch, preferably about 5 to about 50 microns, more preferably about 20 to about 50 microns. Specific types of microstructures, or features, which are suitable for use in the present invention include prisms, pyramids, (micro)lenses, e.g. cylindrical or circular shaped lenses and random diffusing structures.

Prism based microstructures may have a saw tooth shape structure varying in one direction across the entirety of the surface with a pitch of about 50 microns, wherein the pitch is the distance between the centre of adjacent microstructures. (Micro)lenses have a regular or random distribution of lenses, which may be of a low focal length, distributed across the surface on a scale of about 10 to 20 microns. The diffusing structures may possess a random surface texture which is also on a scale (depth and pitch) of about 10 to 100 microns.

The light scattering and/or reflective and/or refractive features may also be referred to as light extraction features.

Heat Sink Plate

The heat sink plate may be located behind and substantially parallel to the base substrate, which may be transparent, and may be connected to the substrate via discrete portions of thermal bonding material. The thermal bonding material may advantageously be located in line or substantially in line with the one or more light sources. The positioning of the discrete portions of thermal bonding material means that there is an air gap located between the substrate and the heat sink plate and between the discrete portions of thermal bonding material. The air gap means that the heat sink plate does not interfere with the light guiding mechanism and ensures uniform light scattering from the features that break the total internal reflection of the guided light, e.g. scattering features. Advantageously, the base substrate and the heat sink plate are not optically coupled. A backlight reflector element, e.g. film may be located in the vicinity of the air gap or gaps to improve optical efficiency. For example, the backlight reflector film may be located on the lower surface of the substrate and/or on the upper surface of the heat sink plate.

The heat sink plate may be made from materials which assist in the dissipation of the heat. Suitable examples include metals such as aluminium. The heat sink plate is typically about 0.2 mm to 10 mm in thickness, for example about 2 mm in thickness or less. The thermal bonding material may be an adhesive such as an epoxy or a silicone or it may be a pressure sensitive adhesive tape or screen/stencil printable polymer with high thermal conductivity. The adhesive may be applied using a needle or by using screen printing. The adhesive tape may be applied using a standard taping machine.

The heat sink plate may be a regular piece of solid flat material and which does not comprise any gaps or slots. Alternatively, the heat sink plate may comprise a number of slots or gaps, optionally of varying size. The gaps or slots may be introduced by machining or manufacturing said gaps or slots into a heat sink plate. A number of cooling fins may be formed by the presence of the gaps or slots. The cooling fins may thus be formed in the plane of the substrate providing a thin arrangement and may be suitably aligned with the one or more light sources. The presence of cooling fins typically results in a more effective and lighter heat sink arrangement.

The use of the heat sink plate according to the present invention provides the means for operating at higher current at a wider temperature range. By running at higher current the light output can be increased thus reducing the number of light sources e.g. LEDs.

The substrate and heat sink may be combined using lamination techniques.

Diffuser

The diffuser may be positioned more closely to the light guide layer when compared with more conventional light guide devices. For example, the distance from the top of the light guide layer to the bottom of the diffuser may be less than about 12 mm. For example the distance may be as low as about 9 mm or about 2 mm. Typically, the distance between the light guide layer and the diffuser is greater than about 2 mm.

The diffuser may be kept separate from the light guide layer by means of a conventional spacing arrangement. For example, a spacing element is located around the edge of the light guide layer.

The diffuser may be chosen from conventional diffusers used in backlights.

Uses of the Light Guide Devices

The light guide devices according to the present invention may be employed for a range of functions including illumination, backlighting, signage and display purposes. Liquid crystal devices are well known in the art. A liquid crystal display device operating in a transmissive mode typically comprises a liquid crystal cell, which may also be referred to as a liquid crystal panel, a backlight unit which may incorporate a light guide device, and one or more polarisers. Liquid crystal cells are also well known devices. In general, liquid crystal cells typically comprise two transparent substrates between which is disposed a layer of liquid crystal material. A liquid crystal display cell may comprise two transparent plates which may be coated on their internal faces respectively with transparent conducting electrodes. An alignment layer may be introduced onto the internal faces of the cell in order that the molecules making up the liquid crystalline material line up in a preferred direction. The transparent plates are separated by a spacer to a suitable distance, for example about 2 microns. The liquid crystal material is introduced between the transparent plates by filling the space in between them by flow filling. Polarisers may be arranged in front of and behind the cell. The backlight unit may be positioned behind the liquid crystal cell using conventional means. In operation, a liquid crystal cell, operating in a transmissive mode, modulates the light from a light source such as a backlight unit which may comprise a light guide device.

BRIEF DESCRIPTION OF THE DRAWINGS

Embodiments of the invention will now be described, by way of example only and without limitation, with reference to the accompanying drawings and the following Examples, in which:

FIGS. 3a and 3b illustrate a plan view of a heat sink plate comprising a number of slots and their position relative to light sources and a light guide device comprising such a heat sink plate respectively, both in accordance with the present invention;

In FIG. 1, a light guide device (1) in side elevation comprises a transparent base substrate (2) made from a transparent polymer sheet such as polyester or polycarbonate and having a refractive index n2. On top of the transparent base substrate (2) are bonded a number of light sources (3) in the form of LEDs. Electrical bonds are indicated at (3a). The distance between the LEDs is typically about 10 mm to about 200 mm. The LEDs illustrated in this particular embodiment are side emitting LEDs and the direction of the light emitted from the LEDs is indicated at (5) and is directed parallel to the plane of the substrate. In an alternative embodiment there may also be present a number of top emitting LEDs. Covering the LEDs and the remaining area of the top surface of the transparent base substrate (2) is a first transparent guide layer (4) also formed from a plastic polymer and having a refractive index n4. Located on the lower surface of the transparent base substrate is a scattering structure (6) in the form of a patterned reflecting ink layer.

Figure 1:
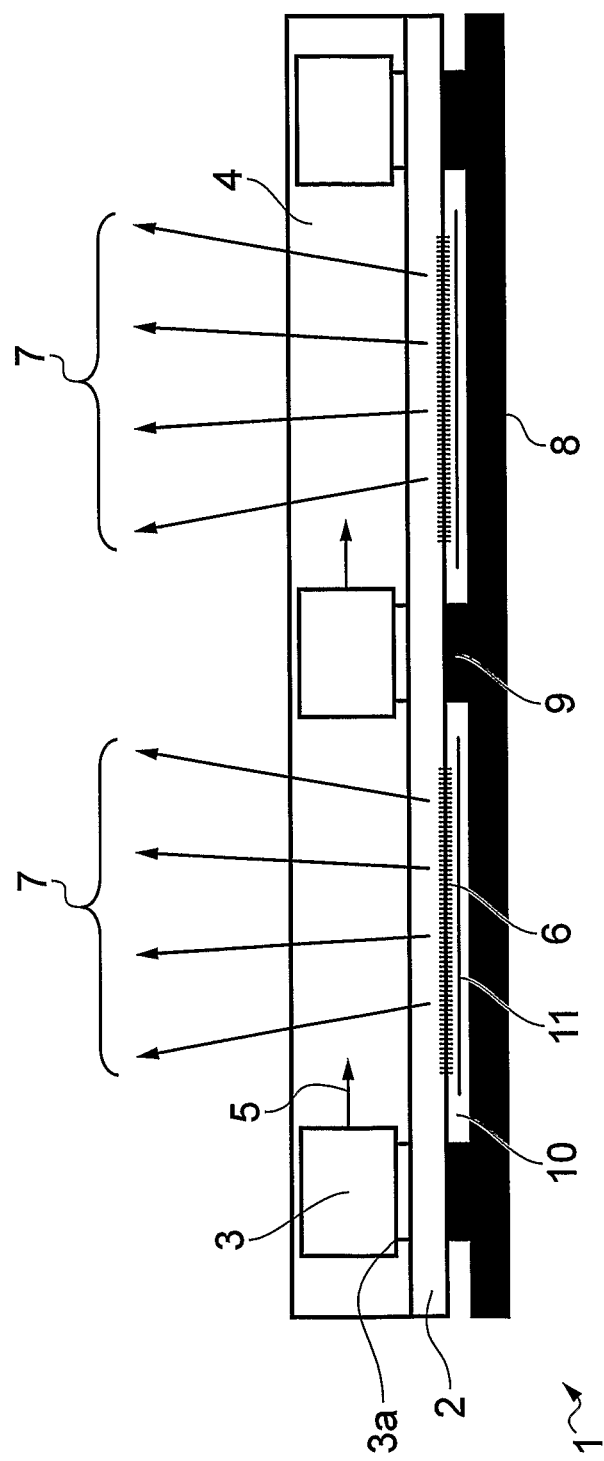
FIG. 1 illustrates a light guide device according to the present invention.

Optionally (not shown), and located on the upper surface of the first transparent guide layer may be a second transparent guide layer having a refractive index n6.

At the perimeter interface between the transparent base substrate (2) and the first transparent guide layer (4), a cavity layer structure (not shown) may be incorporated in order to form a suitable cavity in which the LEDs (3) may be embedded.

The refractive indices of the transparent base substrate and the first transparent guide layer may be such that they satisfy the inequality n2≥n4.

When present, the refractive indices of the second transparent guide layer and the first transparent guide layer may be such that they satisfy the inequality n6≥n4.

In the embodiment shown, light, generated by the LED light sources is initially coupled into the transparent guide layer so as to propagate in a direction substantially parallel to a plane defined by the transparent base substrate. The generated light is guided within both the transparent base substrate and the transparent guide layer or layers due to the effects of total internal reflection. Therefore, the transparent base substrate and the transparent guide layer or layers form a composite structure that acts as the guiding media for the light generated by the encapsulated LED light sources (3).

When the light has propagated as far as the scattering structure (6), it interacts with this structure so as to be redirected and so exit (7) the device via the top surface of the transparent guide layer so providing a backlighting function.

The scattering and/or reflective and/or refracting structures (6) may comprise highly reflective white ink dots. Both the dot size and/or pitch may be varied in order to fine tune the scattering effects.

A heat sink plate (8) is contacted to the lower surface of the base substrate (2) via discrete portions of thermal bonding material (9). An air gap (10) is formed through the use of discrete portions of thermal bonding material. A further light reflecting structure (11) may optionally be introduced on either the lower surface of the substrate (2) or on the upper surface of the heat sink plate (8).

As a result of the fact that there is no air gap between the output of the light sources and the light guiding media, the transparent guide layers provide a simpler, and enhanced means of optically coupling the light within the device.

Figure 2:
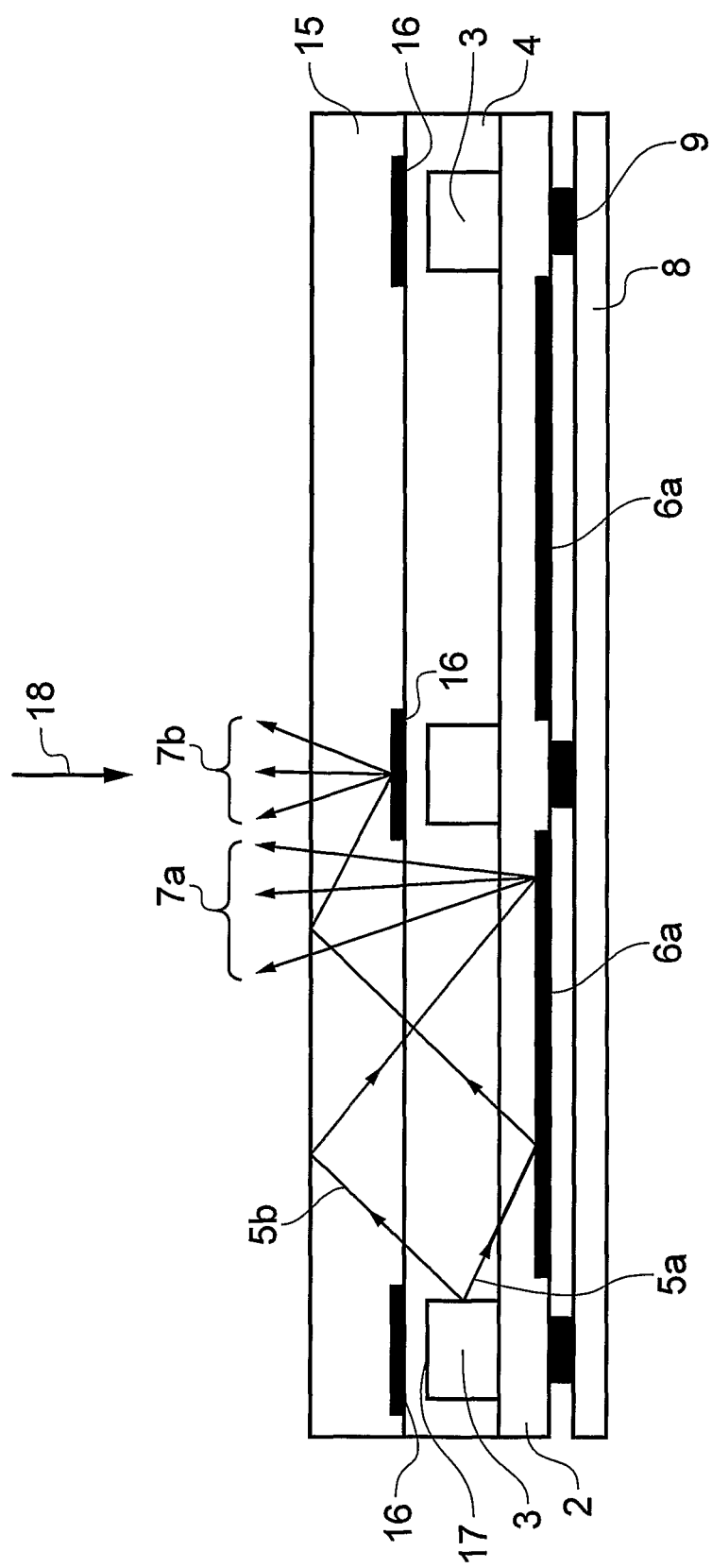
FIG. 2 illustrates a light guide device according to the present invention.

FIG. 2 illustrates a light guide device essentially as shown in FIG. 1 but with an additional transparent guide layer (15) having a refractive index n6 present on the surface of the first transparent guide layer (4). Located at the interface between the first and second transparent guide layers are scattering and/or reflecting and/or refracting structures (16). The refractive indices of the second transparent guide layer and the first transparent guide layer are such that they satisfy the inequality n6≥n4. As a result and can be seen in FIG. 2, light indicated by 5a and 5b generated by the LED light source is initially coupled into the transparent guide layers so as to propagate in a direction substantially parallel to a plane defined by the transparent base substrate. With the refractive index of the transparent base substrate and the second transparent guide layer selected to be equal or higher than that of the first transparent guide layer, the generated light is guided within both the transparent base substrate and the transparent guide layers due to the effects of total internal reflection. Therefore, the transparent base substrate and the transparent guide layers form a composite structure that acts as the guiding media for the light generated by the encapsulated light sources. When the light (5a, 5b) has propagated as far as the scattering structure (6a), it interacts with this structure so as to be redirected and so exit the device via the top surface of the transparent guide layer, either directly, indicated at (7a) or via the scattering and/or reflecting and/or refracting structure, indicated at (7b), so providing a backlighting function. The structure (16) is located at the interface between the first and second transparent guide layers and over the LEDs such that the scattering effects of the structure (16) and the structure (6a) reduce or remove completely the dark appearance of the top surface, indicated at (17) of the LEDs. The second or upper guide layer (15) is providing uniform light distribution across the complete area. In use and when incorporated into a suitable device such as a liquid crystal display, the light guide device illustrated is viewed substantially in the direction indicated at (18). The scattering structures (6a) and (16) may comprise highly reflective white ink dots. Both the dot size and/or pitch may be varied in order to fine tune the scattering effects.

FIGS. 3a and 3b relate to a heat sink plate for use in accordance with the present invention incorporating a number of slots or gaps. More specifically, FIG. 3a illustrates the arrangement of slots relative to the positioning of light sources e.g. LEDs and FIG. 3b is a side view of a light guide device incorporating the slotted heat sink plate. In FIG. 3a, a number of slots (30) are shown positioned relative to the LED light sources (3) which are arranged in a repeating diamond-like arrangement. The cooling fins (not shown) are in line or substantially in line with the LED light sources. In FIG. 3b, a side view of a light guide device incorporating the slotted heat sink plate is illustrated. The position of the slots (30) is indicated in the heat sink plate (8).

Figure 4:
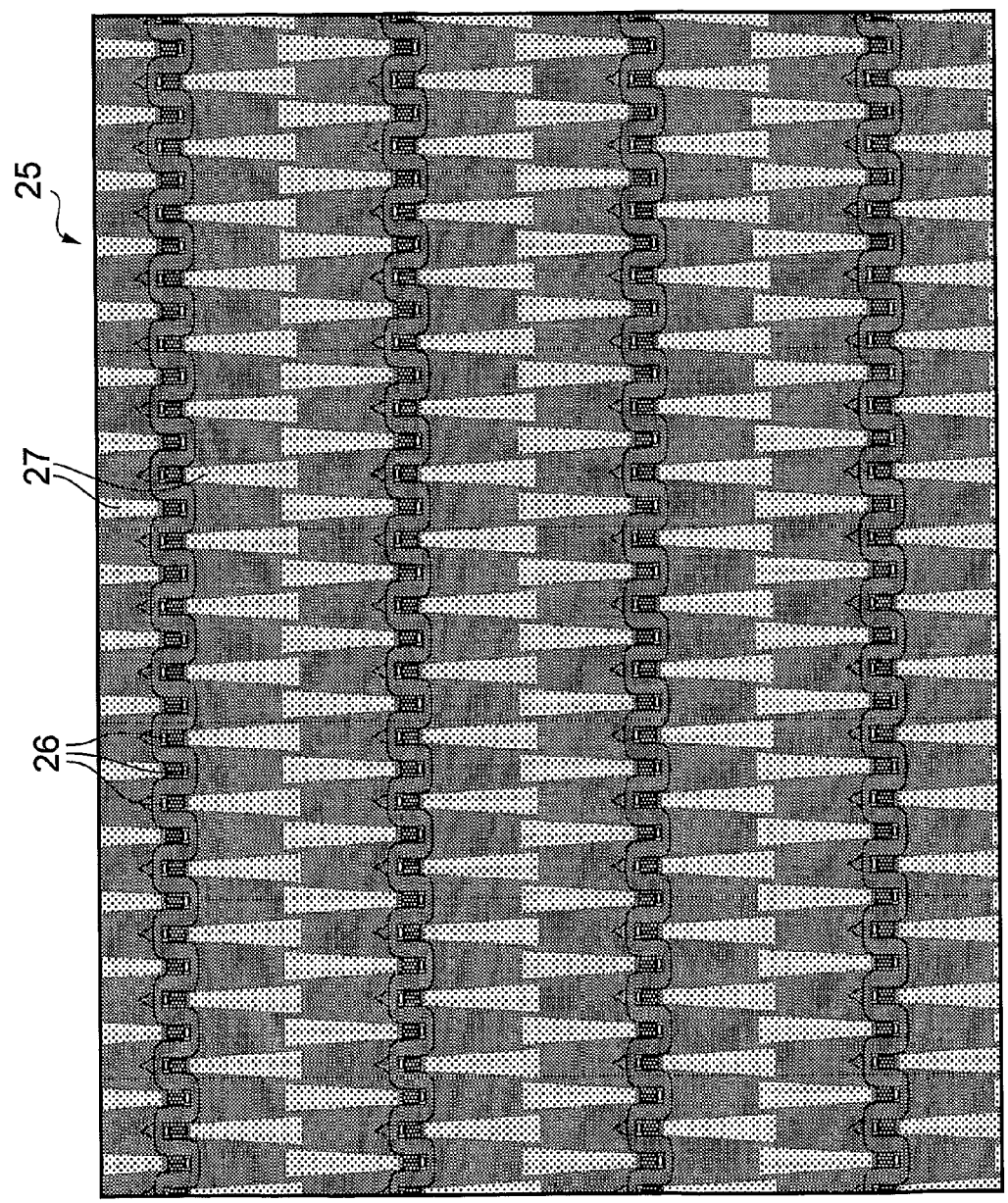
FIG. 4 is an image of a backlight according to the present invention.

FIG. 4 is an image taken of a backlight unit (25). A number of side-emitting LEDs (26), (not all labelled) are shown arranged in rows. The LEDs may also be provided in columns (i.e. by rotating through 90°). The side-emitting LEDs emit light (27) into the plane of the backlight and substantially parallel with the base substrate. In this particular embodiment, an LED emits light in substantially the opposite direction to its immediate neighbours in a given row of LEDs. The backlight may comprise, consist of, or consist essentially of such an arrangement of light sources. In a given row or column, the LEDs may be positioned so that they are substantially in a straight line. For example, as shown in FIG. 4, the LEDs may be positioned so that alternate LEDs are in a straight line, thus forming two substantially parallel lines of LEDs in a given row or column.

Figure 5:
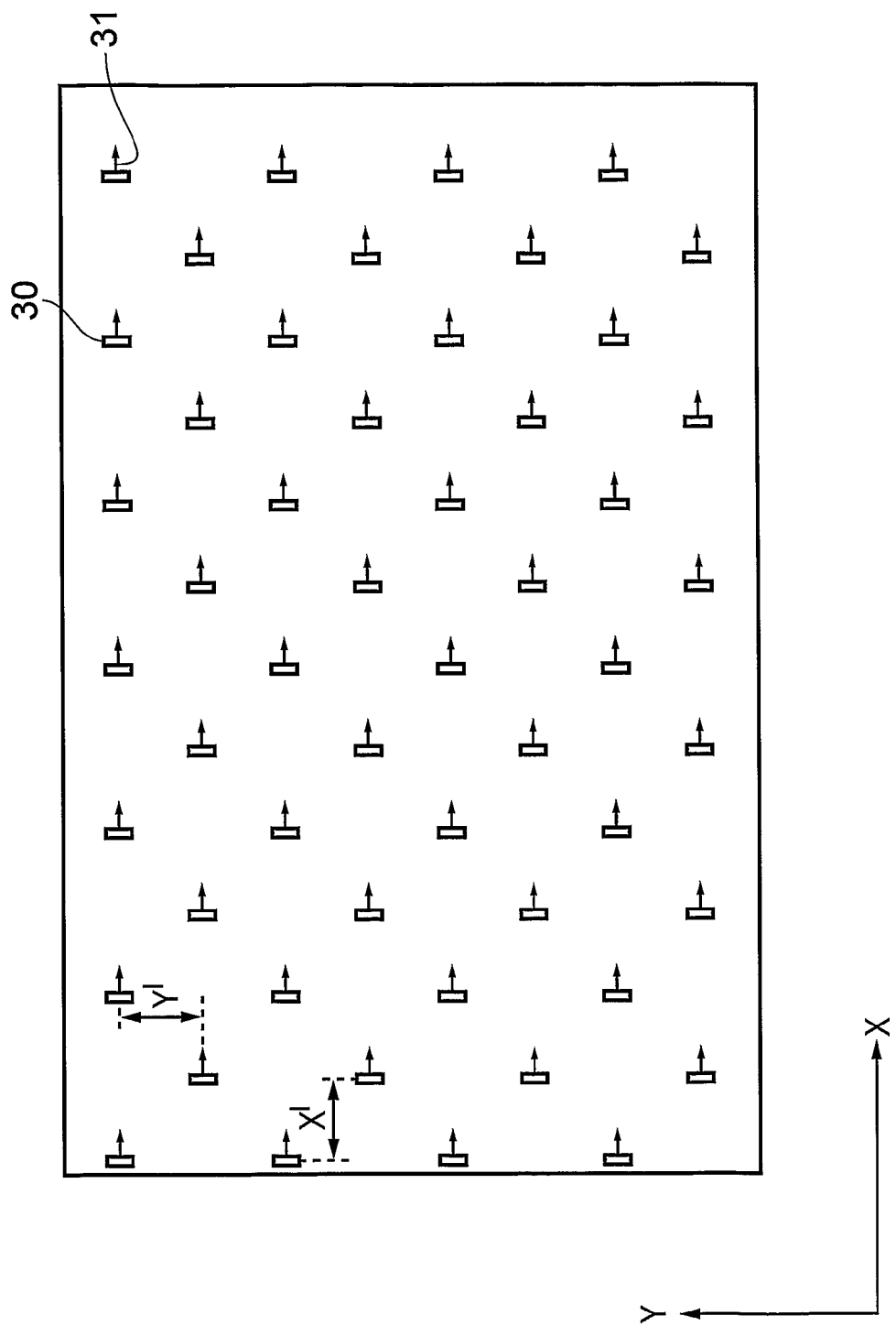
FIGS. 5 to 8 illustrate particular arrangements of the light sources according to the present invention.

FIG. 5 illustrates a preferred arrangement of LEDs in accordance with the present invention. A number of side-emitting LEDs (30), (not all labelled) are shown arranged in rows and columns and forming a repeating diamond like arrangement or array of LEDs across the backlight. The LEDs are arranged such that the light (31) is emitted in the same or substantially the same direction, i.e. into the plane of the backlight and substantially parallel with the base substrate, for all or substantially all of the LEDs. In the embodiment shown in FIG. 5, the x and y coordinates are shown. The distance between the centre point of LEDs in a given row (x axis) may be about 24 mm. The distance between the centre point of LEDs in a given column (y axis) may be about 24 mm. The x axis displacement in adjacent rows may be about 12 mm (this is indicated by $x^I$). The distance between adjacent rows of LEDs may be about 12 mm (this is indicated by $y^I$). This spatial relationship may be repeated over the entirety, or substantially over the entirety, of the backlight. This spatial relationship may be more generally described by $x^I$=(or is substantially equal to) $y^I$. This arrangement is particularly advantageous for a number of reasons. For example, this includes the provision of particularly good luminance uniformity which may also be achieved at a thickness of about 10 mm or less for the full backlight. Other advantages include: effective spreading of thermal load; the presence of a back-plate is not evident visually; preferred spacing distribution for minimising path length in the light guide (i.e. optical loss is minimised); ease of electrical wiring.

Figure 6:
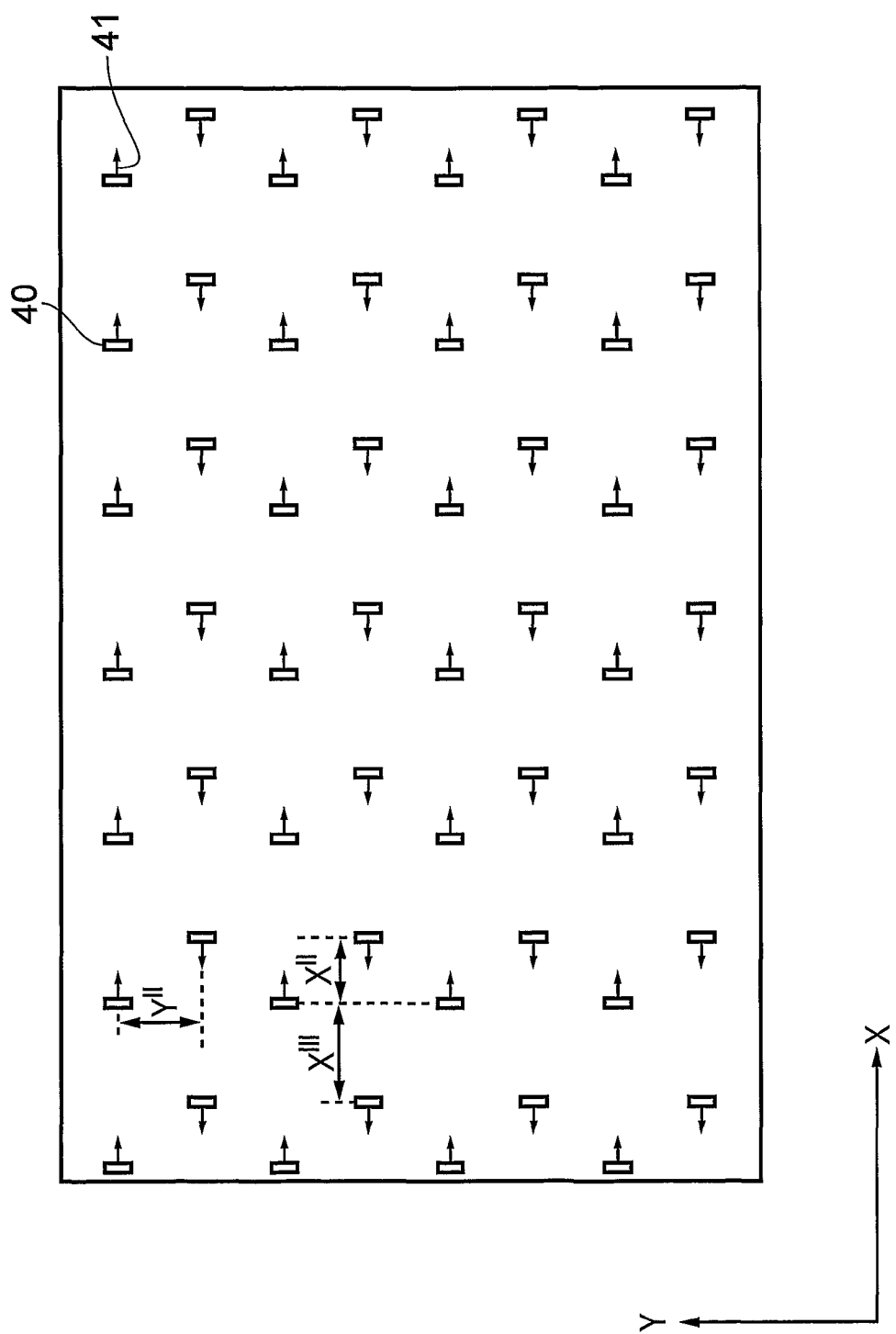

FIG. 6 illustrates a further arrangement of LEDs in accordance with the present invention. A number of side-emitting LEDs (40), (not all labelled) are shown arranged in rows and columns and forming a repeating off-set diamond like arrangement or array of LEDs across the backlight. The LEDs are arranged such that the light (41) is emitted into the plane of the backlight and substantially parallel with the base substrate, for all or substantially all of the LEDs. The light is directed in opposite or substantially opposite directions in alternating rows. In the embodiment shown in FIG. 6, the x and y coordinates are shown. The distance between the centre point of LEDs in a given row (x axis) may be about 24 mm. The distance between the centre point of LEDs in a given column (y axis) may be about 24 mm. The x axis displacement in adjacent rows may be about 10.5 mm (this is indicated by $x^{II}$) and about 13.5 mm (this is indicated by $x^{III}$). The distance between adjacent rows of LEDs may be about 12 mm (this is indicated by $y^{II}$). This spatial relationship may be repeated over the entirety, or substantially over the entirety, of the backlight.

Figure 7:
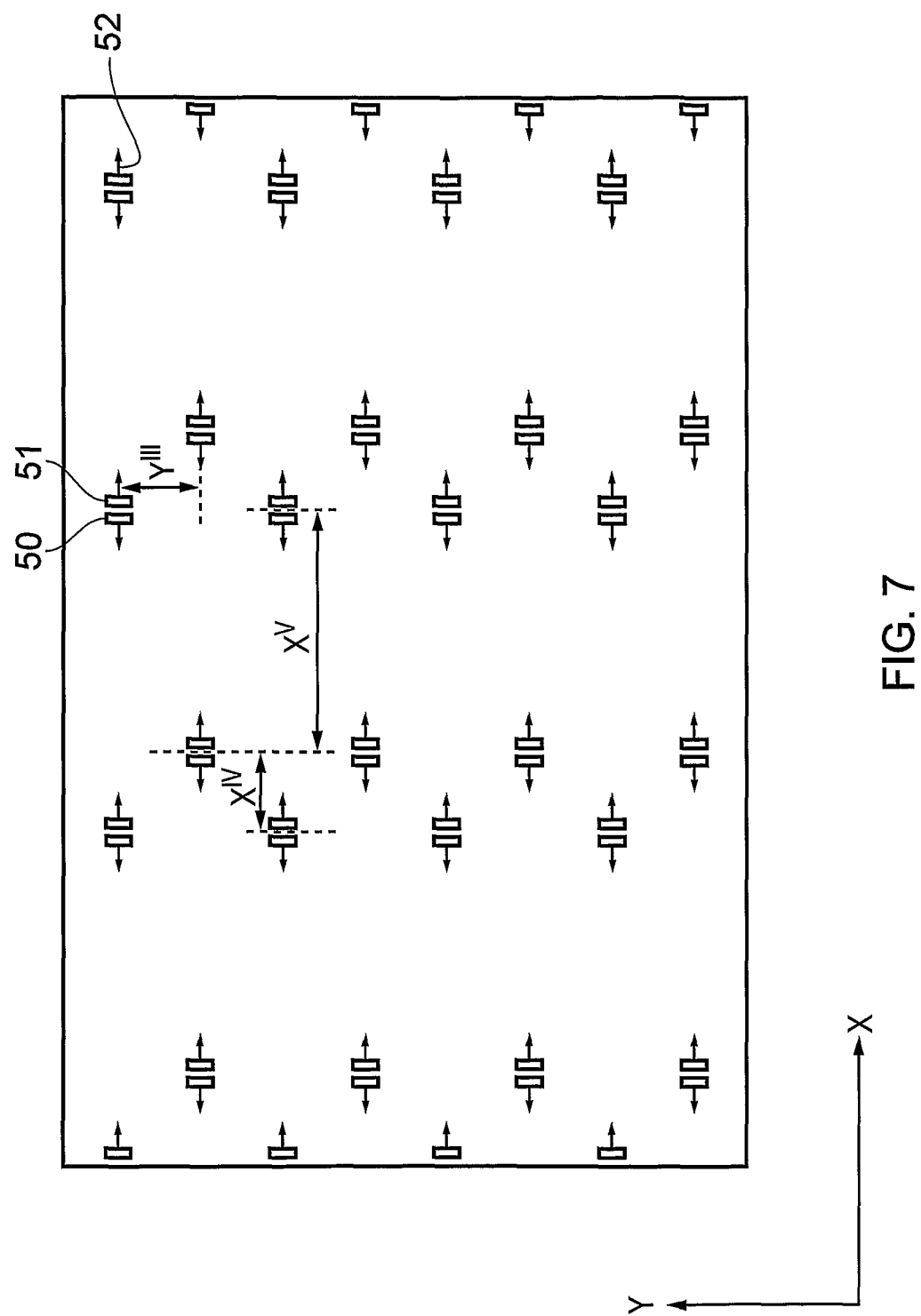

FIG. 7 illustrates a further arrangement of LEDs in accordance with the present invention. A number of pairs of side-emitting LEDs (50, 51), (not all labelled) are shown arranged in rows and columns and forming a repeating arrangement or array of LEDs across the backlight. The LEDs are arranged such that the light (52) is emitted into the plane of the backlight and substantially parallel with the base substrate, for all or substantially all of the LEDs. The light is directed in opposite or substantially opposite directions for LEDs in each pair. In the embodiment shown in FIG. 7, the x and y coordinates are shown. The distance between the centre of adjacent pairs of LEDs in a given row (x axis) may be about 48 mm. The distance between the centre point of LEDs in a given column (y axis) may be about 24 mm. The x axis displacement of pairs of LEDs in adjacent rows may be about 12 mm (this is indicated by $x^{IV}$) and 36 mm (this is indicated by $x^V$). The distance between adjacent rows of LEDs may be about 12 mm (this is indicated by $y^{III}$). This spatial relationship may be repeated over the entirety, or substantially over the entirety, of the backlight.

Figure 8:
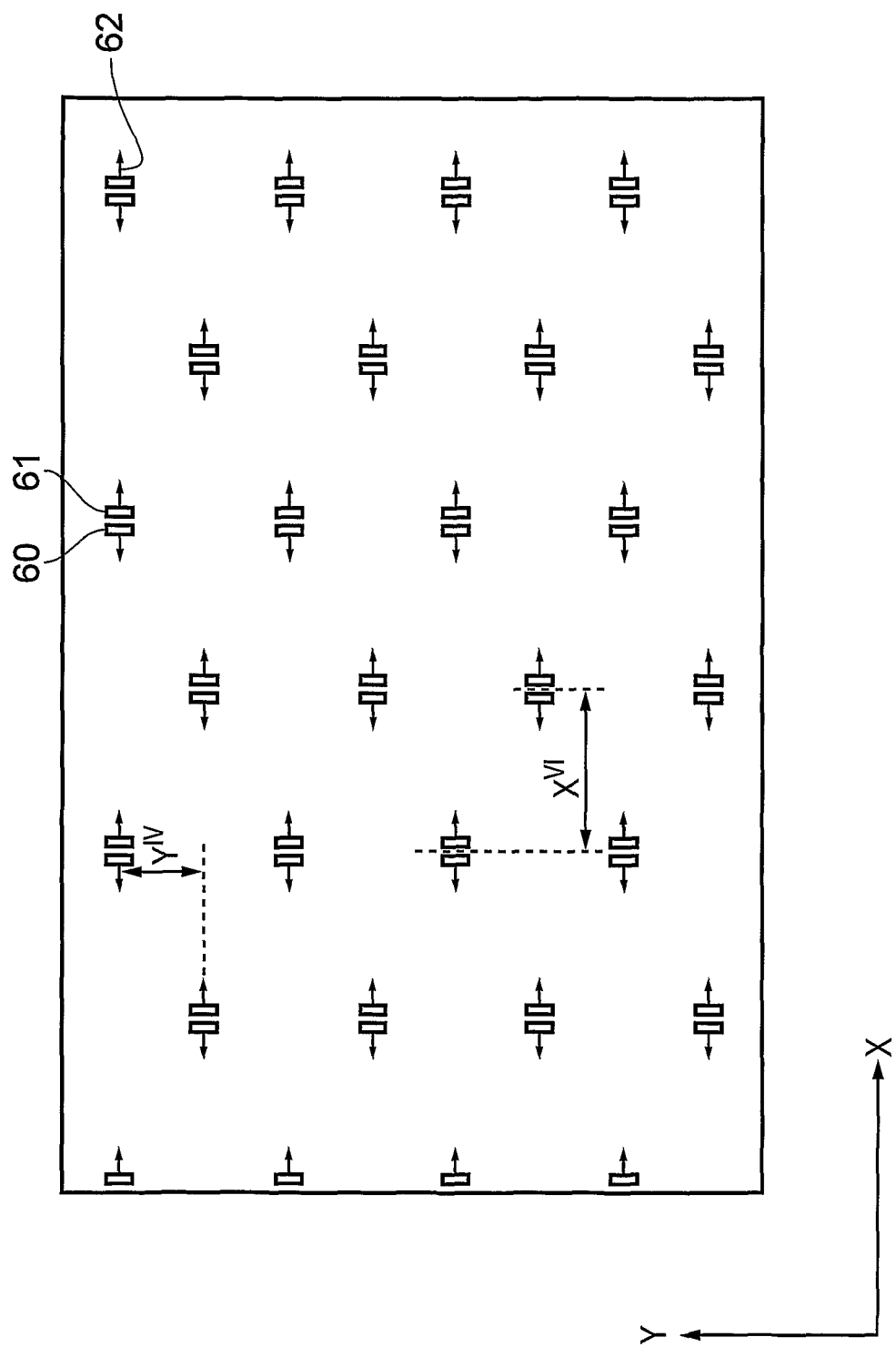

FIG. 8 illustrates a further arrangement of LEDs in accordance with the present invention. A number of pairs of side-emitting LEDs (60, 61), (not all labelled) are shown arranged in rows and columns and forming a repeating arrangement or array of LEDs across the backlight. The arrangement is similar to that shown in FIG. 7. However, the pairs of LEDs are arranged in a more regular diamond-like repeating pattern. The LEDs are arranged such that the light (62) is emitted into the plane of the backlight and substantially parallel with the base substrate, for all or substantially all of the LEDs. The light is directed in opposite or substantially opposite directions for LEDs in each pair. In the embodiment shown in FIG. 8, the x and y coordinates are shown. The longest distance between pairs of LEDs in a given row (x axis) may be about 48 mm. The distance between LEDs in a given column (y axis) may be about 24 mm. The x axis displacement of pairs of LEDs in adjacent rows may be about 24 mm (this is indicated by $x^{V\ I}$). The distance between adjacent rows of LEDs may be about 12 mm (this is indicated by $y^{IV}$). This spatial relationship may be repeated over the entirety, or substantially over the entirety, of the backlight.

EXAMPLES

Example 1

A device in accordance with the invention was constructed as follows. A 0.125 mm thick sheet of transparent polyester was used as a base substrate. A scattering structure comprising white lines of ink was printed onto the underside of the polyester film. The ink used was a white acrylic based, UV curing polymer screen printable ink which is commercially available. On the opposite (or top) side of the polyester film was printed conducting tracks (silver particle loaded conducting epoxy) and conducting adhesive in order to mount a number of LEDs (Stanley Tw1145ls-tr) onto the substrate and provide suitable electrical connections onto the conducting ink tracks. A cavity, about 0.7 mm deep was formed around the perimeter of the base substrate using a cavity layer structure. The cavity was then filled with UV curing transparent polymer (Dymax 4-20688), thus forming a first light guide layer. A spacing element was positioned and secured on the first light guide layer and the diffuser (Shin Wha 97% haze film) was positioned on the spacing element. The distance of the diffuser to the light guide layer was 9 mm. The LEDs were concealed from observation from above, by the combination of light not coupled into the light guide layer and the diffuser. A thin aluminium heat sinking plate of 2 mm thickness was fixed to the base substrate via discrete localised sections of thermal bonding material. Good uniformity of light was observed from the extracted light.

The invention claimed is:
1. A light guide device comprising:
a base substrate having a first refractive index, wherein one or more light sources are mounted upon a first surface of the base substrate;

a first guide layer having a second refractive index that is less than or equal to the first refractive index and which comprises a light output surface, the first guide layer being arranged so as to encapsulate the one or more light sources upon the first surface, wherein the base surface and the first guide layer form a composite transparent structure, wherein light produced by the one or more light sources is guided within both the base substrate and the first guide layer over the first surface; and a heat sink plate attached to a lower surface of the base substrate via discrete portions of thermal bonding material positioned in line with the one or more light sources such that the discrete portions of thermal bonding material are completely blocked from view by the one or more light sources when viewed from the light output surface of the first guide layer, and there are one or more air gaps formed between the heat sink plate and the base substrate.

2. The light guide device according to claim 1, wherein said one or more light sources are positioned directly behind the light output surface and direct light parallel to the plane of the base substrate.

3. The light guide device according to claim 1, wherein the light guide device comprises one or more features that break the total internal reflection of guided light so as to direct light away from the first surface of the base substrate and in the direction of the light output surface.

4. The light guide device according to claim 3, wherein the features that break the total internal reflection of guided light comprise reflecting, scattering or refractive structures or any combination thereof.

5. The light guide device according to claim 1, wherein the light guide device comprises one or more reflecting light scattering structures arranged so as to direct light away from the first surface of the base substrate.

6. The light guide device according to claim 1, wherein upon the first guide layer is mounted a second guide layer having a third refractive index that is equal to or greater than the second refractive index of the first guide layer and at the interface between the first and second guide layers and above the one or more sources of light is located one or more light scattering, reflective or refractive structures or any combination thereof.

7. The light guide device according to claim 1, wherein the base substrate and light guide layer are formed from light transparent polymers.

8. The light guide device according to claim 7, wherein the base substrate or light guide layer is formed from a flexible light transparent polymer or polymers.

9. The light guide device according to claim 1, wherein the base substrate is about 0.1 mm thick.

10. The light guide device according to claim 1, wherein the one or more light sources are selected from one or more LEDs.

11. The light guide device according to claim 10, wherein the one or more LEDs comprise, consist essentially of, or consist of side-emitting LEDs.

12. The light guide device according to claim 11, wherein the one or more LEDs form an array of side-emitting LEDs across the base substrate in a direct-lit arrangement.

13. The light guide device according to claim 12, wherein the one or more LEDs comprise side-emitting LEDs and wherein the array further comprises top emitting LEDs.

14. The light guide device according to claim 1, wherein the base substrate is, or is in contact with, a film with microstructures, wherein an ink is in contact with one or more of said microstructures, wherein said ink reduces the amount of light escaping from said microstructure.

15. The light guide device according to claim 14, wherein the microstructured film is a brightness enhancement film.

16. The light guide device according to claim 14, wherein the ink is a light transmissive ink.

17. The light guide device according to claim 16, wherein the light transmissive ink has the effect of planarising or flattening the microstructures and facilitates light guiding by total internal reflection over the film.

18. The light guide device according to claim 1, wherein the one or more light sources are present in a direct lit arrangement in a two dimensional array forming a plurality of rows and columns of light sources, wherein in a given row or column for two adjacent light sources the angle between the direction of light generated by a first light source in a first direction which is substantially parallel to the plane of the base substrate and the direction of light generated by a second light source in a second direction which is also substantially parallel to the plane of the base substrate is about 180°.

19. The light guide device according to claim 1, wherein the one or more light sources are positioned directly behind the light output surface in a direct lit arrangement forming a plurality of rows and columns comprising the light sources, wherein in a given column or row a light source directs light in substantially the opposite direction when compared to the immediately adjacent light sources.

20. The light guide device according to claim 1, wherein the one or more light sources are positioned directly behind the light output surface in a direct lit arrangement forming a plurality of rows and columns comprising the light sources, wherein all or substantially all of the one or more light sources are arranged to emit light in the same or substantially the same direction substantially parallel or parallel to the plane of the base substrate.

21. The light guide device according to claim 1, wherein the one or more light sources are arranged in a diamond-like repeating pattern.

22. The light guide device according to claim 1, wherein the one or more light sources are spaced equally in rows and spaced equally in columns.

23. The light guide device according to claim 1, wherein the light guide device further comprises a diffuser above the light output surface.

24. The light guide device according to claim 1, wherein the heat sink plate comprises slots and cooling fins.

25. A display device comprising the light guide device according to claim 1.

26. The display device according to claim 25, wherein the display device is a liquid crystal display device.

27. A method of producing a light guide device, the method comprising:
  i. mounting one or more light sources onto a first surface of a base substrate having a first refractive index;
  ii. adding a first guide layer, having a second refractive index that is less than or equal to the first refractive index, to the first surface so as to encapsulate the one or more light sources upon the first surface, wherein the base substrate and the first guide layer form a composite transparent structure, wherein light produced by the one or more light sources is guided within both the base substrate and the first guide layer over the first surface;
  iii. applying one or more scattering, reflective or refractive structures or any combination thereof on the first guide layer or the substrate before the substrate and the first guide layer are combined, such that said one or more scattering, reflective or refractive structures or any combination thereof are located at the interface between the substrate and the first guide layer; or applying one or more scattering, reflective or refractive structures or any combination thereof on a lower surface of the base substrate; and iv. adding a heat sink plate to the lower surface of the base substrate which is opposite the first surface of the base substrate, wherein the heat sink plate is in contact with said base substrate via discrete portions of thermal bonding material positioned in line with the one or more light sources, such that the discrete portion of thermal bonding material are completely blocked from view by the one or more light sources when viewed from the light output surface of the first guide layer.

* * * * *